(12) United States Patent
Albin et al.

(10) Patent No.: US 9,540,061 B2
(45) Date of Patent: Jan. 10, 2017

(54) MAGNET ROBOT CRAWLER

(71) Applicant: Foster-Miller, Inc., Waltham, MA (US)

(72) Inventors: Scott R. Albin, Carlisle, MA (US); Anthony Chesna, Saugus, MA (US); Geoffrey Blake Lansberry, Andover, MA (US); David J. Shane, Cambridge, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 14/722,822

(22) Filed: May 27, 2015

(65) Prior Publication Data

US 2016/0001829 A1 Jan. 7, 2016

Related U.S. Application Data

(62) Division of application No. 13/684,661, filed on Nov. 26, 2012, now Pat. No. 9,096,283.

(51) Int. Cl.
| | |
|---|---|
| *B62D 55/26* | (2006.01) |
| *B62D 55/20* | (2006.01) |
| *B62D 55/265* | (2006.01) |
| *H01F 7/02* | (2006.01) |

(52) U.S. Cl.
CPC .......... *B62D 55/202* (2013.01); *B62D 55/265* (2013.01); *H01F 7/0231* (2013.01)

(58) Field of Classification Search
CPC ........ B62D 55/265; B62D 55/26; B62D 55/18
USPC ...................... 180/9.1, 6.7, 901; 305/185, 46
See application file for complete search history.

(56) References Cited

U.S. PATENT DOCUMENTS

| | | | |
|---|---|---|---|
| 1,342,412 A | 6/1920 | Armington | |
| 2,132,661 A | 10/1938 | Temple | |
| 3,682,265 A | 8/1972 | Hiraoka et al. | |
| 3,777,834 A | 12/1973 | Hiraoka et al. | |
| 3,960,229 A | 6/1976 | Shio | |
| 4,789,037 A | 12/1988 | Kneebone | |
| 4,890,567 A | 1/1990 | Caduff | |
| 5,285,601 A | 2/1994 | Watkin et al. | |
| 5,435,405 A | 7/1995 | Schempf et al. | |
| 5,894,901 A | 4/1999 | Awamura et al. | |
| 6,125,955 A | 10/2000 | Zoretich et al. | |
| 6,668,951 B2 | 12/2003 | Won | |
| 6,672,413 B2 | 1/2004 | Moore et al. | |
| 6,889,783 B1 | 5/2005 | Moore et al. | |
| 7,624,827 B2 | 12/2009 | Moser et al. | |
| 8,393,421 B2 | 3/2013 | Kornstein et al. | |
| 8,567,536 B1 | 10/2013 | Canfield et al. | |
| 2010/0131098 A1 | 5/2010 | Rooney et al. | |
| 2014/0090906 A1 | 4/2014 | Kornstein et al. | |

*Primary Examiner* — Kevin Hurley
*Assistant Examiner* — Michael Stabley
(74) *Attorney, Agent, or Firm* — Iandiorio Teska & Coleman, LLP

(57) ABSTRACT

A magnetic robot includes a chassis and at least one track assembly associated with the chassis. The track assembly has a linear series of non-circulating magnet modules displaceably mounted with respect to the chassis. A driven track circulates about the magnet modules and travels on guide portions of the magnet modules.

20 Claims, 11 Drawing Sheets

MAGNET ROBOT CRAWLER

RELATED APPLICATIONS

This application is a divisional of U.S. patent application Ser. No. 13/684,661 filed Nov. 26, 2012 which hereby claims the benefit of and priority thereto under 35 U.S.C. §§119, 120, 363, 365, and 37 C.F.R. §1.55 and §1.78, which application is incorporated herein by this reference.

GOVERNMENT RIGHTS

Certain aspects of this invention were developed under U.S. Government Office of Naval Research contract No. N00014-08-C-0408. The U.S. Government may have certain rights in the subject invention.

FIELD OF THE INVENTION

The invention relates to magnet robotic crawlers and similar systems.

BACKGROUND OF THE INVENTION

Magnetic robot crawlers configured to traverse ferrous surfaces such as construction steel, tanks, piping, pier pilings, or hull of a ship have been designed. Some crawlers use electromagnets (see for example U.S. Pat. No. 4,890,567); others use permanent magnets as disclosed in U.S. Pat. Nos. 3,682,265; 3,777,834; 5,285,601; and 5,894,901 all incorporated herein by this reference.

U.S. Pat. No. 5,285,601 shows a robot with permanent magnet track treads. U.S. Pat. No. 5,894,901 discloses a complex design with circulating permanent magnets in the track. U.S. Pat. No. 3,682,265 shows a v-belt track below fixed permanent magnets.

Some structures include discontinuities such as weld beads up to 0.5 inches tall as well as other obstacles. If a ferrous surface is submerged and exposed to currents of 15 knots, in one example, the drag and lifting forces on the robot can be substantial. If the robot drives over a discontinuity, it may pitch outwardly from the surface and can be lifted off the surface due to the drag and/or lift forces resulting in a loss of the robot especially if it is not tethered to the surface.

Since autonomous operation is desirable and since such a robot can be expensive, it is desirable to avoid the loss of the robot. If rotating magnetic treads are used, energy must be used to lift the treads off the hull during revolution of the tracks which can affect battery life in the case of an autonomous battery powered robot.

SUMMARY OF THE INVENTION

In one aspect and in one preferred example in accordance with the invention, a robot is provided which is able to traverse discontinuities and still remain securely attached to the surface. In one example, a fairly large, low profile robot includes cameras and the like and also compliant permanent magnet track assemblies which enable the robot to remain on the ferrous surface despite surface discontinuities such as weld beads and large drag and lift forces. In one preferred version, the permanent magnets do not circulate extending battery life.

Featured is a magnetic robot including a chassis and at least one track assembly associated with the chassis. The track assembly includes a plurality of magnet modules displaceably mounted with respect to the chassis and including a track guide portion. A driven track is disposed about the magnet modules and travels on the magnet module guide portions.

In one design, the magnet modules further include guide walls for the track. In one example, the magnet modules include at least one permanent magnet sandwiched between a flux return backer and an intensifier pole piece. Preferably, there are two adjacent permanent magnets having opposite polarity and the intensifier pole piece converges from a broad portion to a narrower distal portion. There may be a protective shoe over the intensifier pole piece distal narrower portion.

The chassis may include a slotted frame for the magnet modules and, in this design, the magnet modules include a head portion received in the slotted frame. Further included may be a spring between the slotted frame and the head portion. One version of a slotted frame includes a top guide rail for the track.

The robot track may include slats coupled to a chain. In one example, the slats include discontinuities to prevent magnetic flux shunting and spaced bottom angled ribs for traction. Adjacent slats may have oppositely angled ribs in a repeating herringbone pattern. Also, the slat bottom ends can be angled upwardly and outwardly.

In some designs, one or more magnet module guide portions include at least one force sensor. Also, a fairing may have a lift reducing profile fore and aft of the robot.

One track assembly comprises a linear series of non-circulating magnet modules displaceably mounted with respect to a frame, each magnet module including a guide portion, and a track about the magnet modules and including a guided portion traveling with respect to the magnet modules and guided by the magnet module guide portions. The guided portion of the track may include a chain and a magnet module guide portion may include a chain rail.

Also featured is a magnet track assembly comprising a series of non-circulating adjacent magnet modules extending in a first direction and displaceably mounted in a frame in a second direction and a track extending about and circulating with respect to the series of magnet modules.

Also featured is a method of operating a robot, the method comprising displaceably mounting a plurality of non-circulating magnet modules with respect to a robot chassis and driving an endless belt about the magnet modules and guided by the magnet modules.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1A:
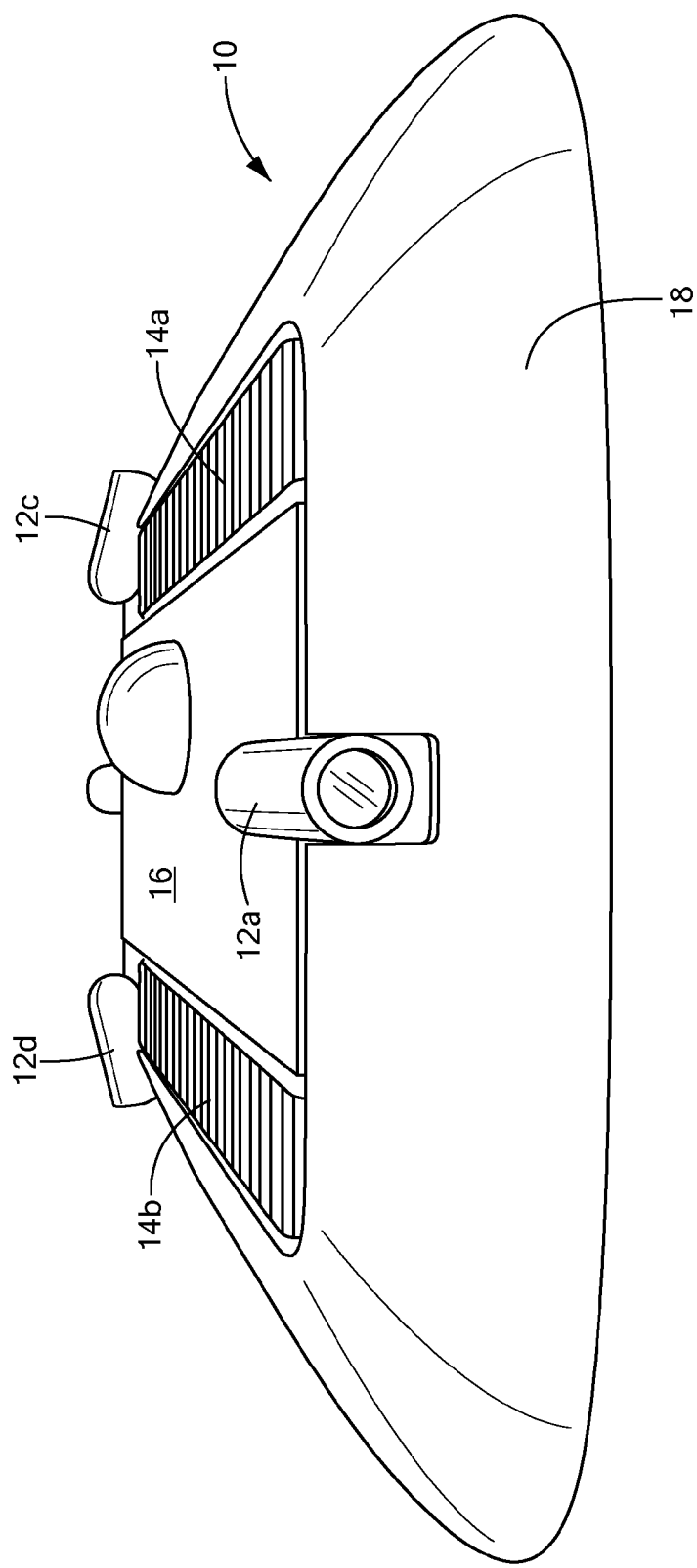
FIG. 1A is a schematic three dimensional rear view of an example of a robot in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1B:
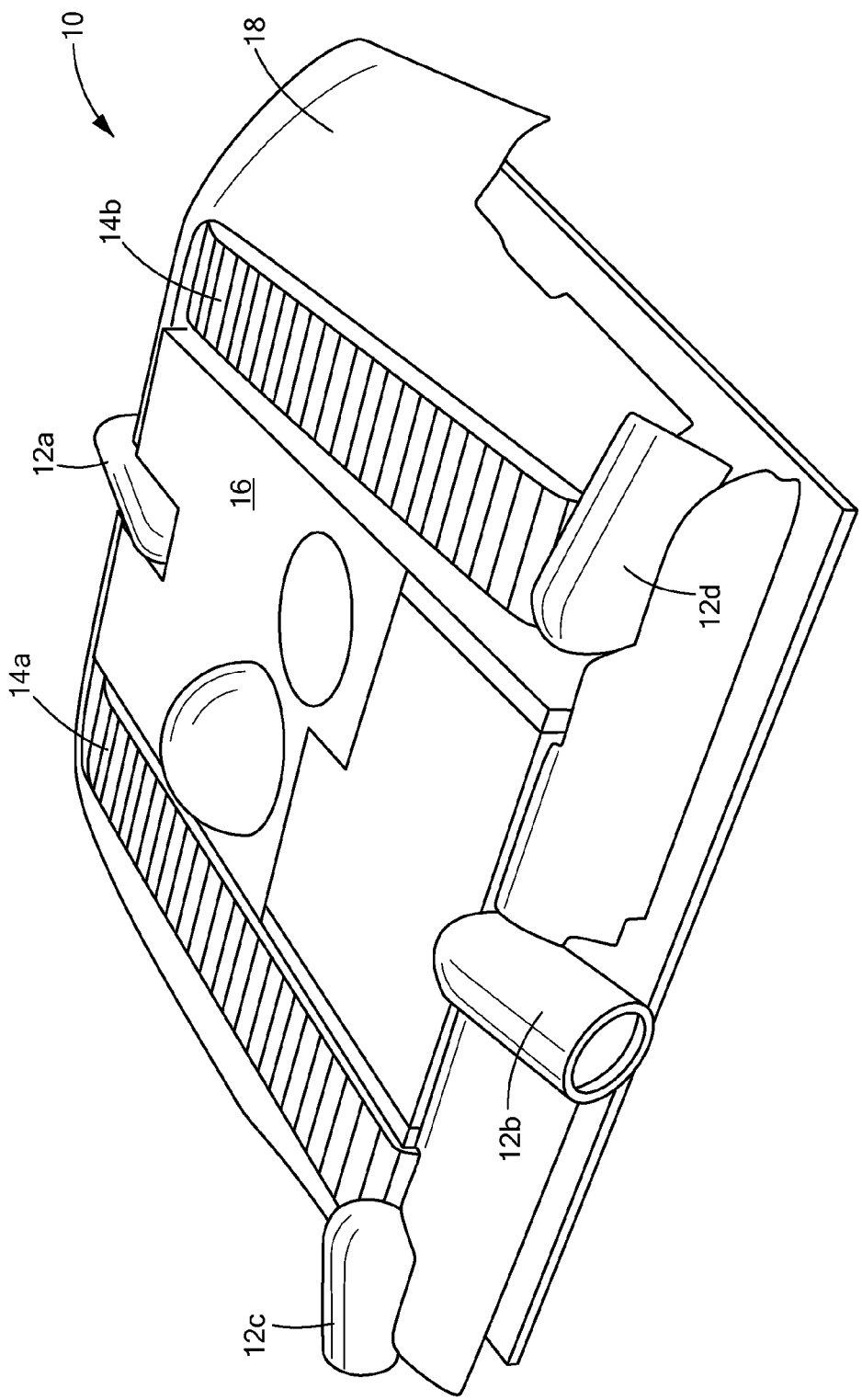
FIG. 1B is a schematic three dimension front view of the robot of FIG. 1B.

FIGS. 1A and 1B show an example of a crawler robot 10 which is 6.5 inches tall and 39 inches by 41 inches in area and with inspection cameras 12a-12d and track assemblies 14a and 14b driving chassis 16 which is at least partially surrounded by fairing 18.

Figure 2:
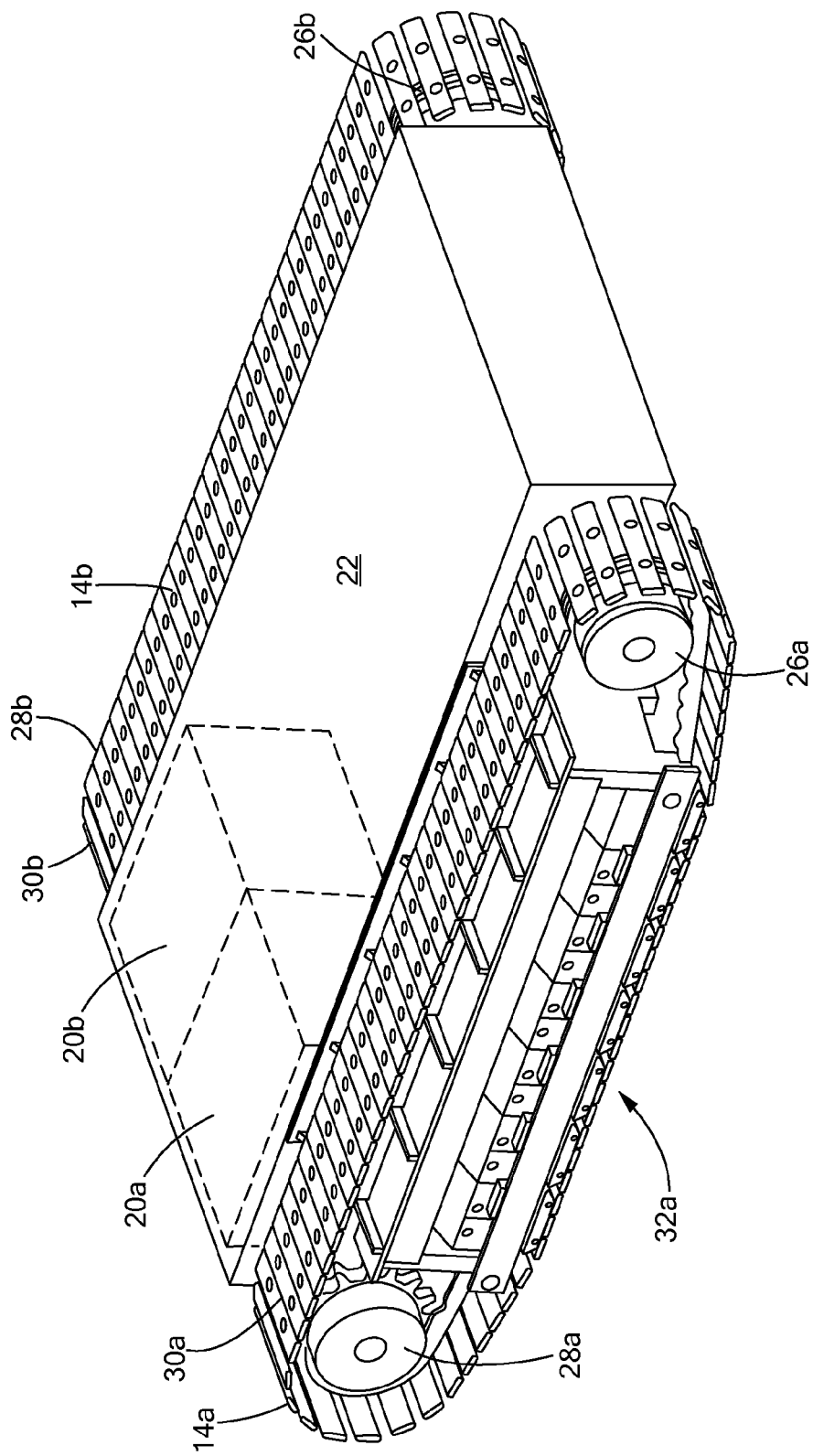
FIG. 2 is a schematic three dimensional view showing a robot in accordance with FIGS. 1A and 1B with the fairing removed.
Figure 3:
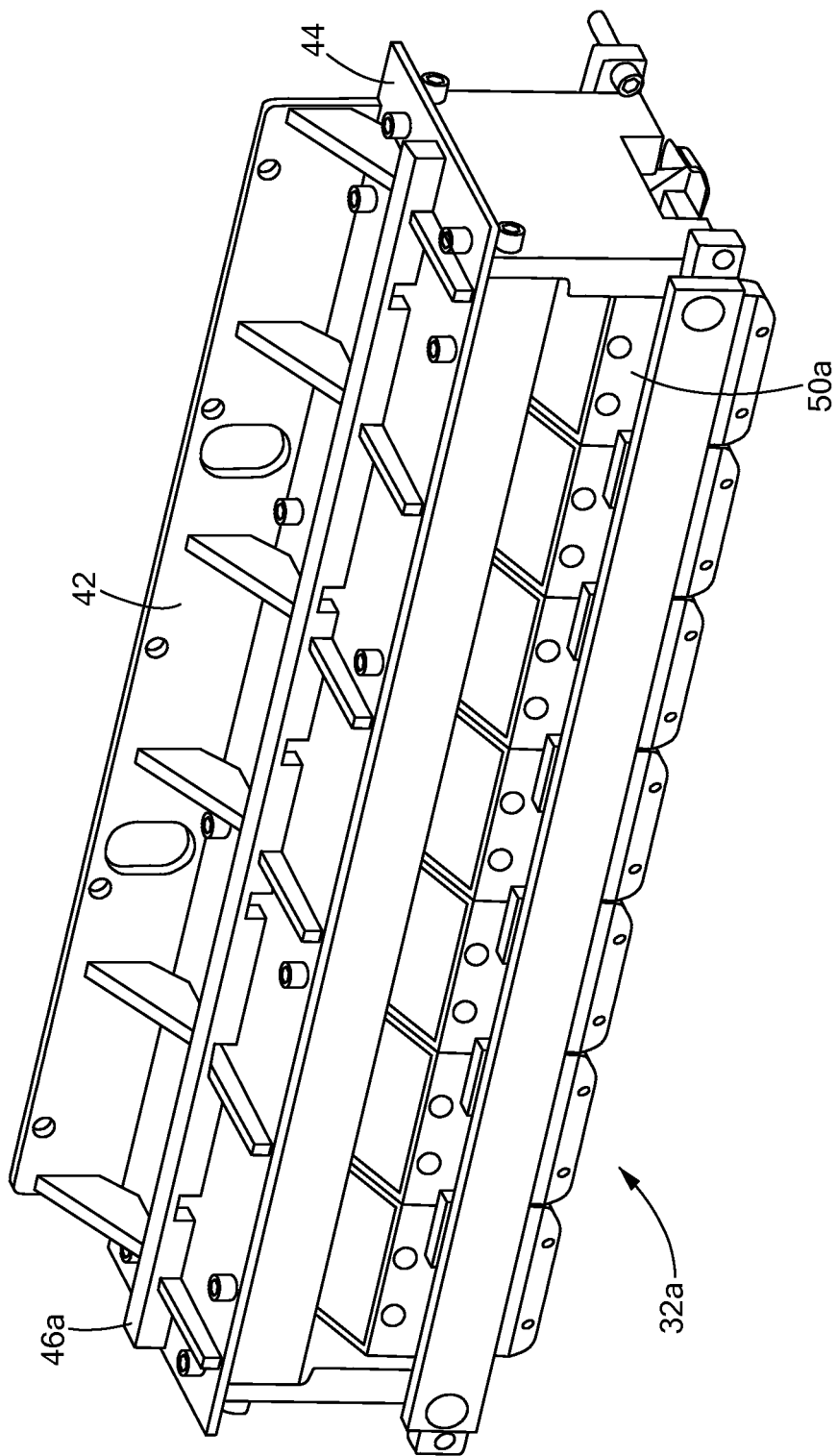
FIG. 3 is a schematic three dimensional side view of a magnetic subassembly for the tracks of the robot shown in FIG. 2.
Figure 4:
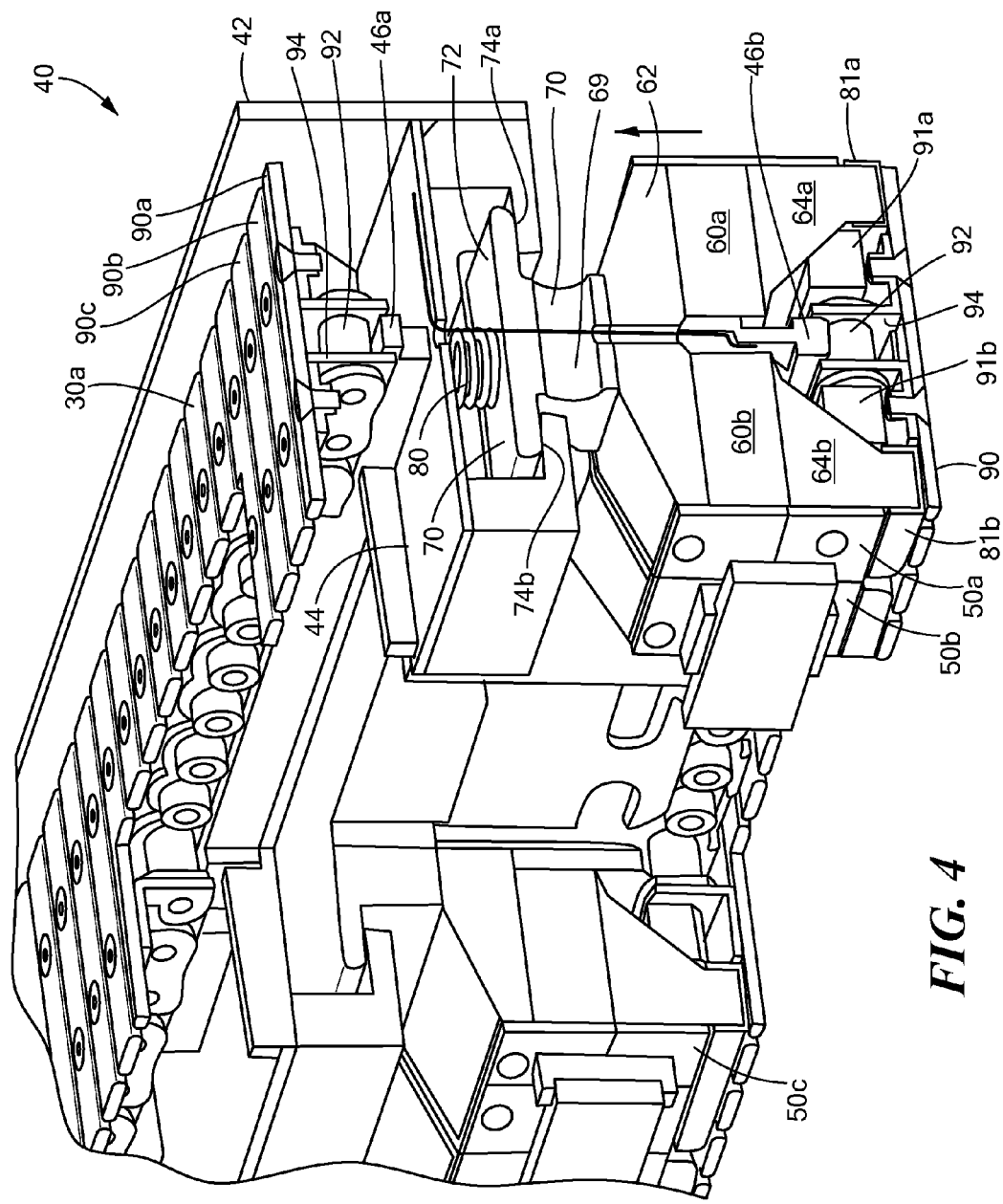
FIG. 4 is a schematic three dimensional illustrative view showing portions of the subassembly of FIG. 3.

FIG. 2 shows the fairing removed and the chassis housing batteries 20a and 20b, motors, electronic subassembly 22, and the like. Rear sprockets 26a and 26b are motor driven and forward idler sprockets 28a and 28b are spring loaded to tension track belts 30a and 30b looped over rear driven sprockets 26, forward idler sprockets 28, and about a magnetic subassembly affixed to the chassis on each side thereof. Magnetic subassembly 32a is shown in FIGS. 2-4.

In one design, a linear series of 7-8 individual magnet modules are included in each subassembly 32a. FIGS. 3-4 show subassembly frame 40 with plate 42 fastened to the chassis and plate 44 extending outwardly therefrom. Top track rail 46a is on the top of plate 44. Magnet modules 50a, 50b, 50c and the like in a series are displaceably mounted with respect to the frame 40 and thus the chassis enabling compliance and flexibility for the track assemblies as they encounter discontinuities. The magnet modules do not circulate with the tracks but they are displaceable upwards (in the Figures) as discussed below.

In this particular example, each magnet module 50 includes permanent magnets 60a and 60b sandwiched between flux retainer backer 62 and intensifier pole pieces 64a and 64b. Adjacent permanent magnets 60a and 60b have opposite polarity, for example, the top face of 60a is south while the top face of magnet 60b is north.

Attached to backer 62 in this particular example is T-shaped head piece 70 received in slotted chassis frame portion 72 defined by plate 44 and inwardly angled members 74a and 74b which form spaced shelves or stops 76a and 76b for the top of T-shaped head 70 above neck portion 69 which is attached to backer 62. Spring 80 between head 70 and plate 44 biases the magnet modules downward (in the figure) until rail 46b hits roller 92 but allows a magnet module to travel ½ inch or more upwards in the presence of a discontinuity and/or to rock back and forth as spring 80 is compressed and the top of T-shaped head 70 displaces from spaced shelves 76a and 76b and travels upwards toward plate 44. The other modules of the track stay down. Spring 80 is typically set in a counter bore in head piece 70. Other structures for rendering the magnet modules compliant with respect to the chassis are possible.

Figure 5:
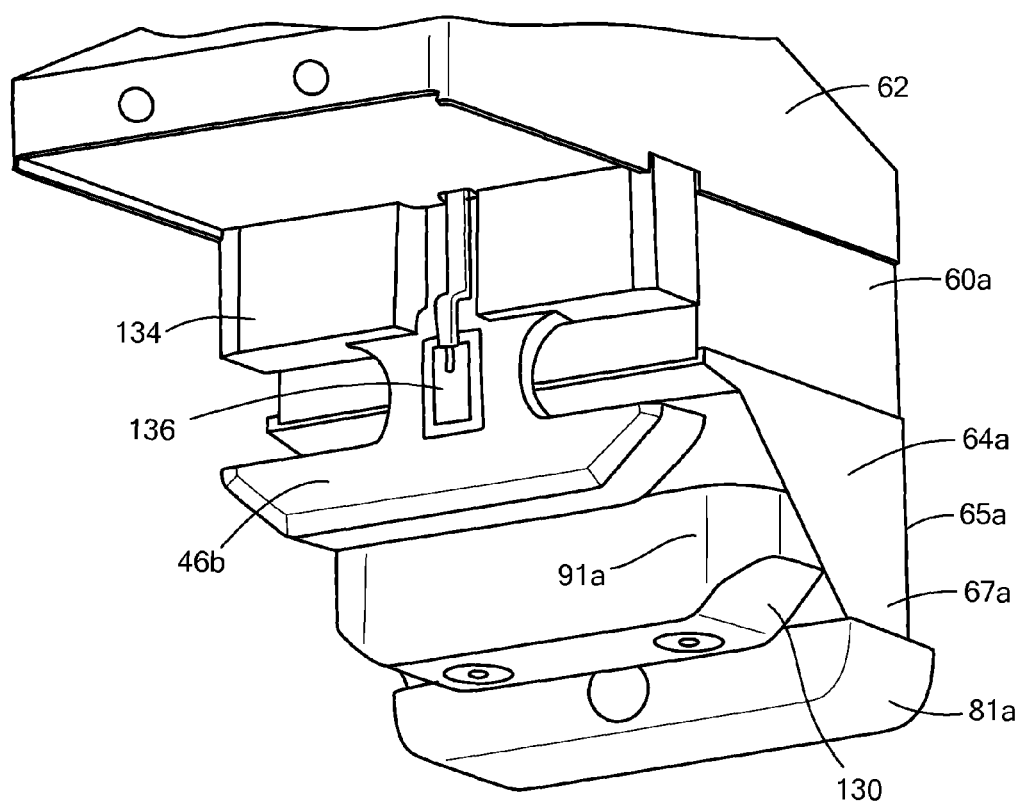
FIG. 5 is a schematic three dimensional partially cutaway view of a magnet module component of the subassembly shown in FIG. 4.
Figure 6:
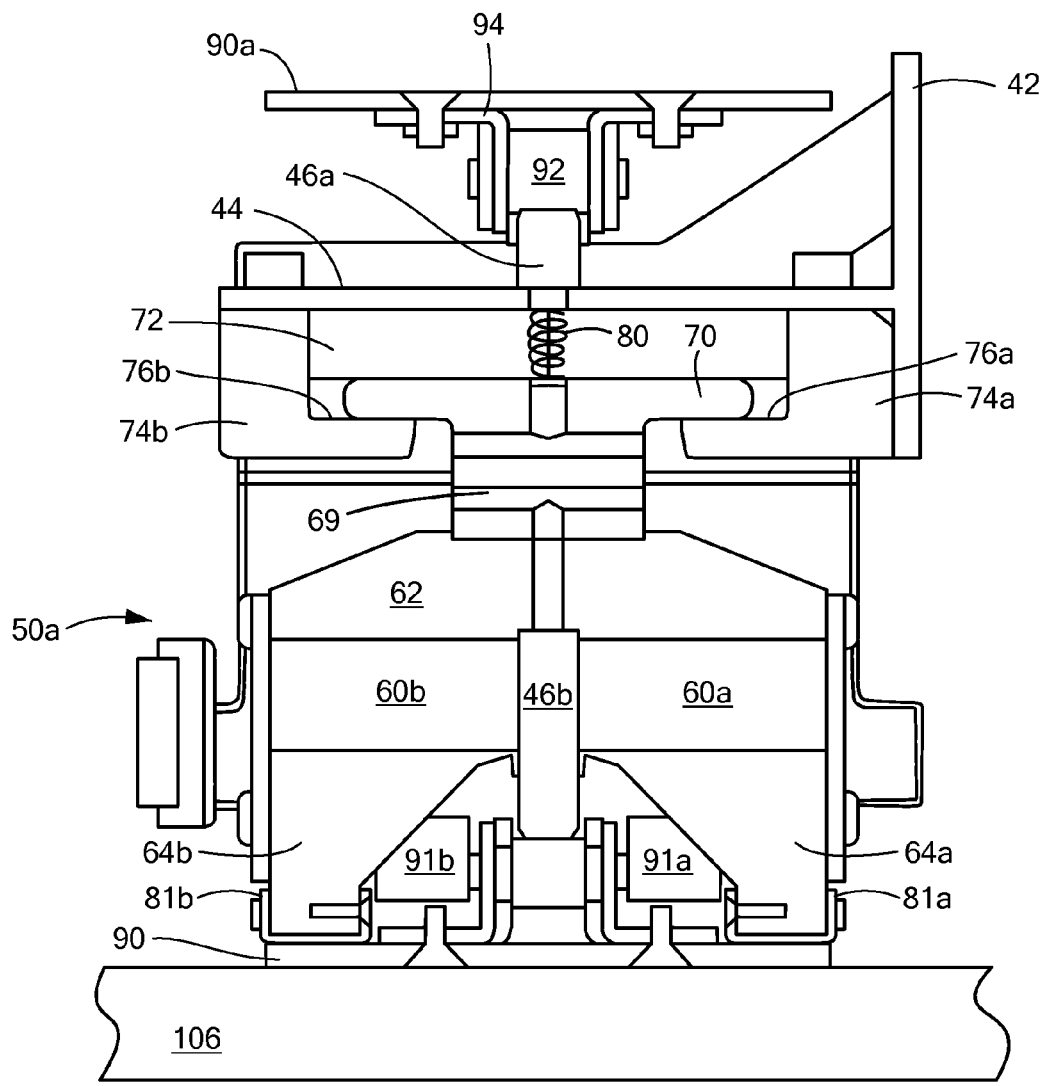
FIG. 6 is a schematic cross sectional view of the magnet module shown in FIG. 5.

In the version shown, the magnet modules further include a guide such as rail 46b between magnets 60a and 60b and between intensifier pole pieces 64a and 64b. Here, intensifier pole pieces 64a and 64b converge from broad portion 65a (as shown for pole piece 64a, FIG. 5) to narrow distal portion 67a fitted with protective (e.g., bronze) shoe 81a. This opening between intensifier portions 64a and 64b also preferably includes laterally spaced chain guide wall members 91a and 91b and depending track rail 46b. A fastener or the like may extend through head piece 70, pole piece 62, and into bottom rail 46b to fasten all these components together.

Figure 7:
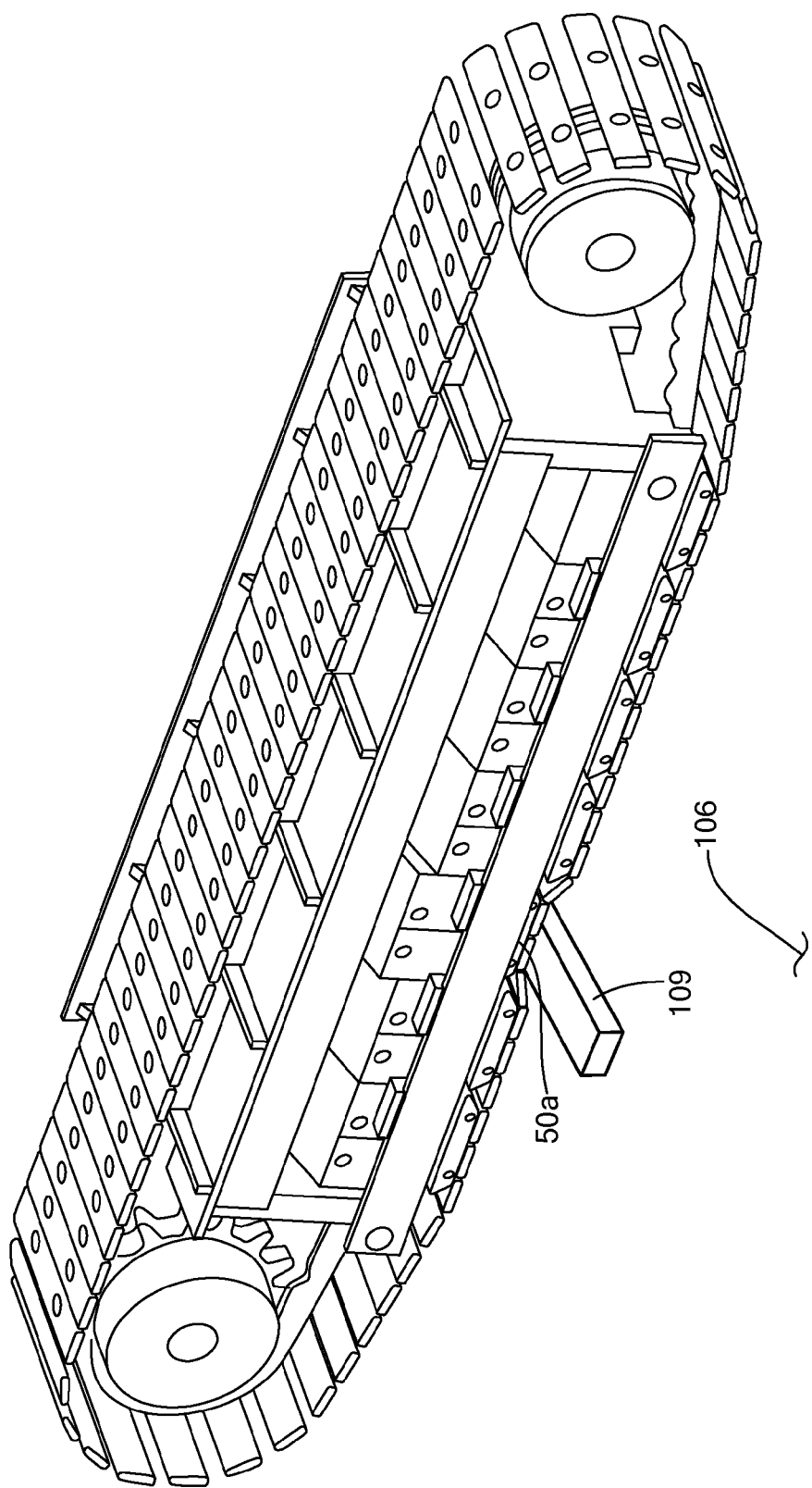
FIG. 7 is a schematic side view of the robot of FIGS. 1-2 traversing a discontinuity.

In this particular embodiment, driven track belt 30a includes slats 90a, 90b, 90c and the like fastened to chain 92 via chain frame 94. The rollers of the chain (typically two per link) travel on the rails 46a and 46b and between chain guide wall members 91a and 91b. As shown in FIG. 7, when module 50a encounters discontinuity 109 on hull 106, module 50a rises up but the other modules stay down on the hull.

In other embodiments, the track may include a guided travel structure other than a chain and the magnet modules can be configured differently from the structures shown in FIGS. 4-7. Moreover, all the magnet modules need not be configured the same.

Figure 8B:
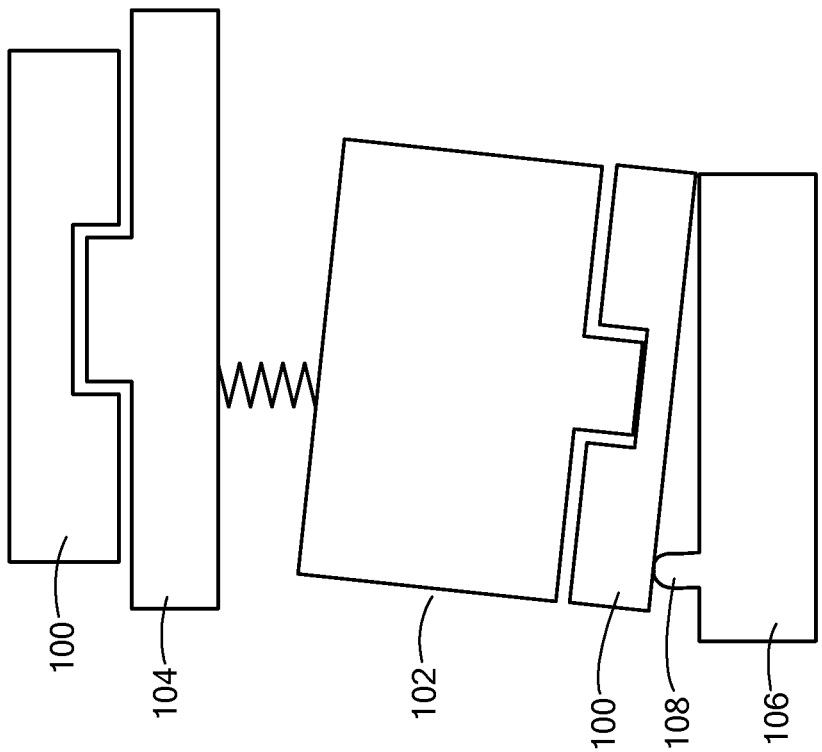
FIG. 8B schematically depicts how the magnet module of 8A displaces upwardly in the presence of a discontinuity on the surface of the ferromagnetic surface.
Figure 8A:
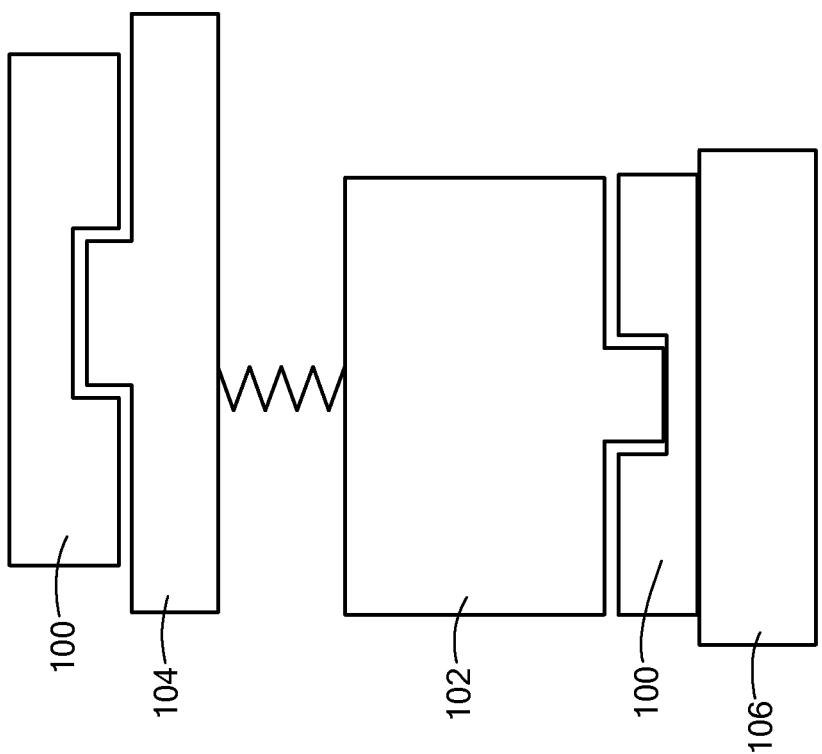
FIG. 8A is a highly schematic cross sectional diagram showing another magnet module in accordance with the invention biasing the robot track on a ferromagnetic surface.

For example, FIGS. 8A and 8B show track 100 and magnet module 102 displaceable with respect to chassis 104 (or a structure attached to the chassis). When hull 106 discontinuity 108, FIG. 8B is encountered, this magnet module is displaced upwardly as shown but the other magnet modules in the series stay down as shown in FIG. 8A close to hull 106 enabling the robot to adhere to the hull even in the presence of large drag and lift forces and discontinuities.

Referring now to the previous embodiment discussed above as an example in FIGS. 1-7, FIG. 9 shows the magnet flux lines for magnet module 50a showing how efficient the flux path is to hull 106. 150-225 lbs. pull off force per magnet module for a 350 lb robot is preferred enabling the robot to stay attached to a ferrous substrate even in the presence of 450 lbs of drag force and 200 lbs of lifting force. In one particular embodiment, the robot crawler is able to navigate on a submerged ferrous surface exposed to currents up to 15 knots over bio-fouling areas and/or discrete (small in area) obstacles 0.38-0.50 inches tall such as weld beads, steps, and the like. The low profile configuration of the robot presents minimal flow resistance.

Two tracks are preferably used for skid steering and the four cameras depicted in FIGS. 1A and 1B are used for machine vision. In non-tethered operation, control and video signals are transmitted through the water. The tracks preferably exhibit a high surface area contact for good traction on a hull and the chain and track slat construction provide for corrosion resistance, durability, a high coefficient of friction to minimize slipping, and compatibility with the magnetic structure. Stainless steel materials are preferred. The magnetic hold down subsystem allows the robot to stay low to the surface while going up and over small bumps or steps. Each magnet module preferably has a 0.50 inch vertical range of motion or float. Spring loading of each module controls the overall chassis suspension stiffness while allowing each magnet module to move up and down to follow the surface while maintaining a constant low crawler attitude to the flow. Positioning the magnets over the rotating tracks reduces the chance that the magnets or pole pieces will get caught on or interfere with crawler movement over obstacles or steps while maintaining a small fixed standoff of the magnet modules over a ferrous surface for less decay of the magnet force. Most force of the mechanical motion is absorbed by the chain support rails 46b whose height is set for a nominal 0.02 inches clearance from the protective shoes 80a and 80b to the track slat 90, FIG. 4.

Figure 9:
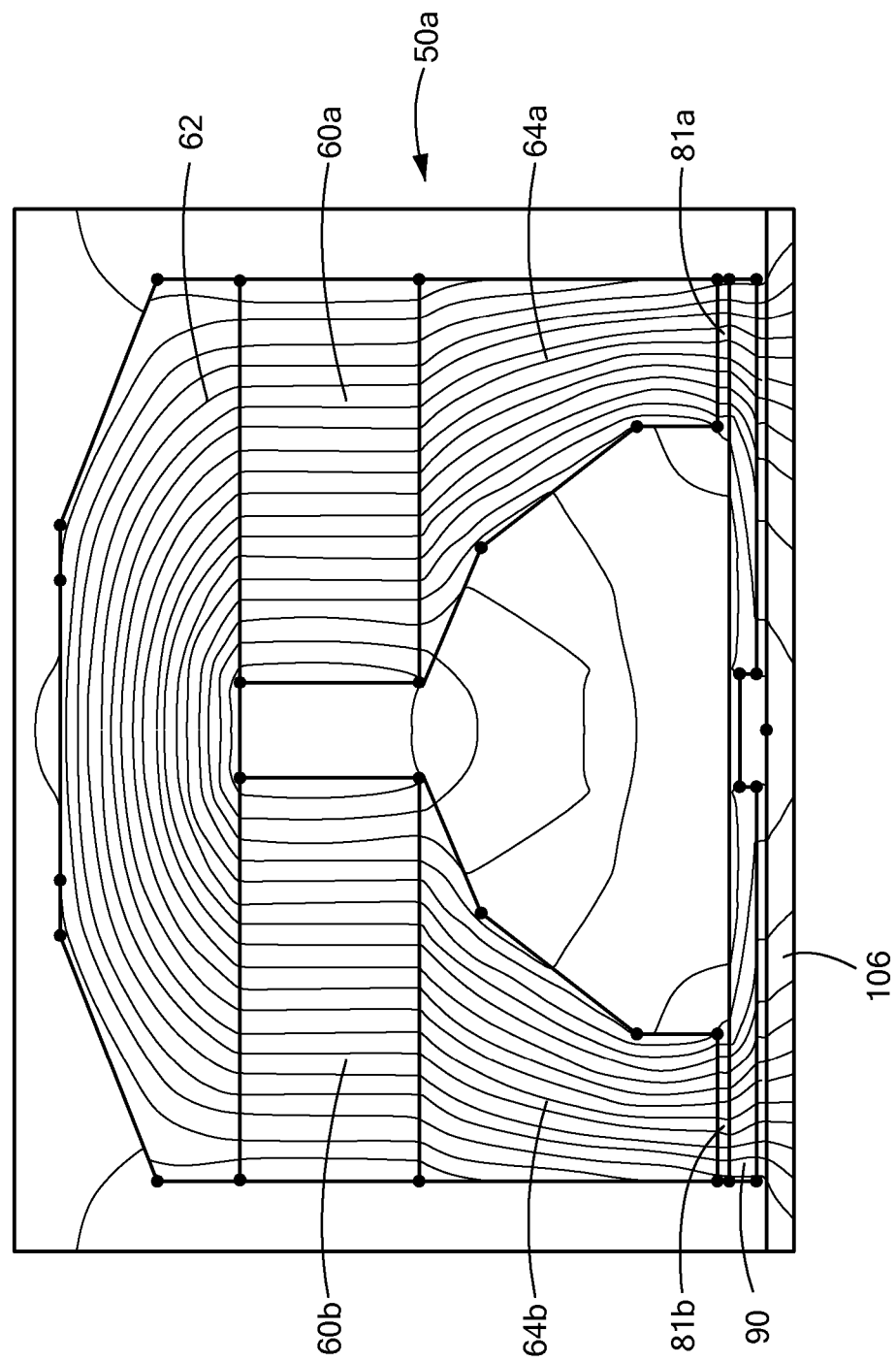
FIG. 9 is a schematic cross sectional front view showing the circular magnet flux path for the specific design of a module as depicted in FIGS. 5-6.
Figure 10:
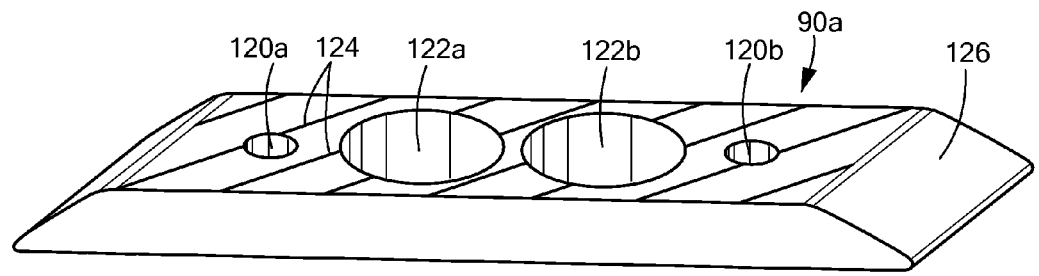
FIG. 10 is a schematic view showing the bottom surface of a track slat in accordance with one particular example of the invention.

FIG. 10 shows one preferred track slat 90a with holes 120a and 120b for fasteners to affix the slat to the chain frame and also discontinuities (e.g., holes) 122a and 122b for minimizing flux "cross talk" or travel across from one magnet to the other above the ferrous surface which would shunt or short circuit the intended circular path which is over the magnets, through a pole piece and slat portion, into the ferrous surface, and across the surface and back up as depicted in FIG. 9.

Two magnets per module provide an efficient controlled flux loop. The steel backer plate connects the two magnets on top and provides good module structure and provides an efficient flux path on the top of the magnets. The tapered pole pieces under each magnet are shaped to intensify the flux circuit directly through the track slats. Most of the chain parts are non-magnetic to minimize interference with the flux pattern and the track slats are preferably highly magnetically permeable to maximize transmission of flux through the slats to a steel surface.

Spaced angled ribs 124, FIG. 10 are machined or otherwise formed in the bottom face of the slats for traction. Adjacent slats may have oppositely angled ribs in a repeating herringbone pattern to resist slipping in all directions and to crush soft attached materials or substances such as biomatter. The slat ends are angled as shown in FIG. 10 at 126 meaning the top of the slat is longer than the bottom of the slat. This design assists in maneuverability of the robotic crawler as it drives at an angle across an obstruction.

Figure 11:
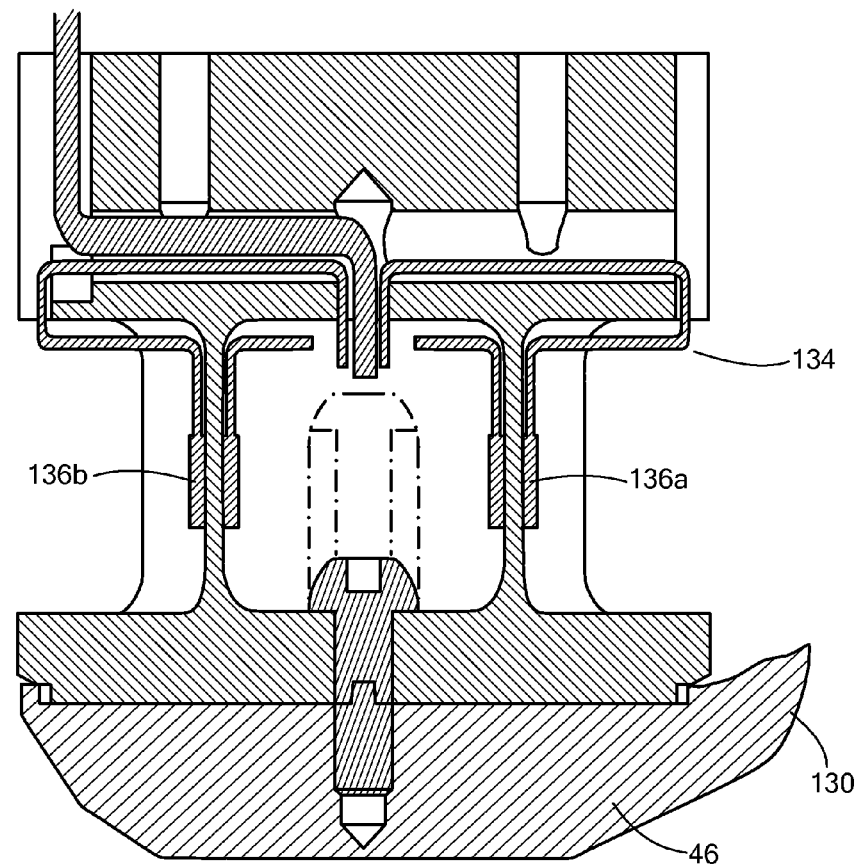
FIG. 11 is a schematic cross sectional view showing an example of a chain guide rail with one or more strain gages in accordance with examples of the invention.

FIG. 11 shows how a track guide rail 46 fore and/or aft portions may include an upwardly curved ski portion 130 for better operation in the case of a slack in the track chain. The rail structure 134 sandwiched between the permanent magnets and the intensifier pole pieces (see FIG. 5) can include strain gauges 136a, 136b, and the like forming a load cell used to monitor the hold down force and to adjust the robots' path of travel and/or behavior accordingly. The load cells can be located, for example, in every other module.

In other designs, fixed magnets can be used underneath the crawler chassis to increase the hold down force. Also, fairing 18, FIGS. 1A and 1B in the front of the robot typically has a short S-curved profile to minimize lift. This profile does increase drag when exposed to currents but reduces the "zipper effect" of the robot magnet modules being pulled away from the ferrous surface one at a time. A medium taper fairing profile is preferred on the sides of the robot to reduce drag. There is some increased lift due to this profile which is resisted by the magnet modules discussed above. Known ferrous surface inspection, cleaning, navigation, energy harvesting, and other technologies may be incorporated as well as various behaviors and control algorithms known to those skilled in the art. In all the various embodiments and versions, it is preferred that the robot be able to traverse discontinuities and still remain securely attached to the surface and thus the compliant permanent magnet modules for the track assemblies, one example of which is disclosed herein, are preferred.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A track assembly comprising:
   a frame;
   a linear series of non-circulating magnet modules each displaceably mounted in a biased manner with respect to the frame, each magnet module including a guide portion; and
   a track about the linear series of non-circulating magnet modules and including a guided portion traveling with respect to the magnet modules and guided by the magnet module guide portions.

2. The assembly of claim 1 in which the guided portion of the track includes a chain.

3. The assembly of claim 1 in which the frame further includes another guide portion.

4. The assembly of claim 1 in which each magnet module guide portion includes a rail.

5. The assembly of claim 1 in which each magnet module includes at least one permanent magnet sandwiched between a flux return backer and an intensifier pole piece.

6. The assembly of claim 5 in which there are two adjacent permanent magnets having opposite polarity.

7. The assembly of claim 5 in which an intensifier pole piece converges from a broad portion to a narrower distal portion.

8. The assembly of claim 7 further including a protective shoe over the intensifier pole piece distal narrower portion.

9. The assembly of claim 1 in which the frame is slotted.

10. The assembly of claim 9 in which each magnet module includes a head portion received in the slotted frame.

11. The assembly of claim 10 in further including a spring between the slotted frame and the head portion.

12. The assembly of claim 1 in which the track includes slats coupled to a chain.

13. The assembly of claim 12 in which the slats include discontinuities to prevent shunting.

14. The assembly of claim 12 in which the slats include spaced ribs for traction.

15. The assembly of claim 14 in which said ribs are angled.

16. The assembly of claim 15 in which adjacent slats have oppositely angled ribs in a repeating herringbone pattern.

17. The assembly of claim 13 in which the slat bottom ends angled outwardly and upwardly.

18. The assembly of claim 1 in which one or more of said magnet modules include at least one force sensor.

19. A track assembly comprising:
a linear series of non-circulating magnet modules displaceably mounted with respect to a frame, each magnet module including a guide portion;
a track about the magnet modules and including a guided portion traveling with respect to the magnet modules and guided by the magnet module guide portions; and
each magnet module including at least one permanent magnet sandwiched between a flux return backer and an intensifier pole piece.

20. A track assembly comprising:
a slotted frame;
a linear series of non-circulating magnet modules displaceably mounted with respect to the slotted frame, each magnet module including a guide portion and a head portion received in the slotted frame; and
a track about the magnet modules and including a guided portion traveling with respect to the magnet modules and guided by the magnet module guide portions.

* * * * *